United States Patent Office 2,819,293
Patented Jan. 7, 1958

2,819,293

PROCESS FOR THE PREPARATION OF CHLORINE-CONTAINING DERIVATIVES OF BENZENE CARBOXYLIC ACIDS

Cornelis van der Stelt, Amsterdam, Netherlands, assignor to N. V. Koninklijke Pharmaceutische Farbrieken v/h Brocades-Stheeman & Pharmacia, Amsterdam, Netherlands, a limited liability company of the Netherlands No Drawing. Application June 27, 1955
Serial No. 518,396

Claims priority, application Netherlands July 15, 1954

6 Claims. (Cl. 260—468)

Halogen derivatives of several benzene carboxylic acids are already known.

Bellstein 10, 175–176, mentions the 3-chloro- and the 3,5-dichloro derivative of 4-hydroxybenzoic acid; both can be obtained by reacting said acid with fuming hydrochloric acid and hydrogen peroxide. Zincke (Ann. 261 (1891), 208–254) succeeded in preparing a derivative of said acid with five chlorine atoms by treating it in acetic acid solution at 100° C. with an excess of chlorine; the compound is a cyclohexenone derivative. The methyl esters of the 3-chloro- and the 3,5-dichloro derivative of 4-hydroxybenzoic acid, too, have been described; vide Beilstein, 1. c. While the former ester could be obtained, for example, by hydrolysis of the methoxy compound, the latter ester was prepared by chlorination of the methyl ester of 4-hydroxybenzoic acid.

Of 4-aminobenzoic acid, the 3-chloro- and the 3,5-dichloro derivative have been described. The monochloro derivative is not formed by simple chlorination of the acid; it was obtained (J. L. Sirks, Thesis, Groningen, 1952, pp. 19–20) by oxidation and hydrolysis from 3-chloro-4-acetamino-toluene. By chlorination of the said acid with hydrochloric acid and potassium chlorate in the cold, Elion (Rec. 44 (1925), 1108) obtained, besides large quantities of trichloroaniline, also the 3,5-dichloro derivative. During the same treatment, but at a higher temperature, chloranil was formed. The methyl ester of the dichloro compound was also prepared (Ber. 74B (1941), 807–824).

Of 2,4-dihydroxybenzoic acid, the 3-chloro and the 3,5-dichloro derivative are known. According to Monatshefte f. Chemie 46 (1926), 143–156, the dichloro derivative was prepared by the action of an excess of chlorine on resorcyclic acid. The monochloro compound was obtained from the said acid by the action of sulphuryl chloride.

Halogen derivatives of 2-hydroxy-4-amino-benzoic acid are also known, viz. the 3,5-dibromo and di-iodo derivatives, and also the 5-monoiodo derivative. The said dibromo derivative was obtained by adding the calculated quantity of bromine to the acetic acid solution of the acid (J. Chem. Soc. (1949), 1498–1503). Iodination to the 5-monoiodo derivative was effected by means of an alkaline hypoiodite solution, which was subsequently acidified (La Ricerca Scientifica 20 (1950), 80–82). By carrying out the iodination with iodine chloride, it was possible to obtain the 3,5-di-iodo derivative (Proc. Ind. Acad. Sc. A 32 (1950), 357).

Experiments carried out by applicants confirmed the statements in the literature to the effect that e. g. the bromination of 2-hydroxy-4-aminobenzoic acid only resulted in the formation of the 3,5-dibromo derivative; when the methyl ester of this acid was brominated, again a bromine atom was introduced only in the 3 and the 5 position.

Now the striking discovery was made that highly chlorinated derivatives of esters of benzene carboxylic acids, which have an O and/or $NH_2$ group in the 2 and/or 4 position and which may already be substituted by chlorine in the 3 and/or the 5 position, can readily be obtained. To attain this end, the alkyl esters of these acids are subjected to direct chlorination until the products formed contain six or more chlorine atoms per molecule.

The chlorination may take place either in a neutral or in an acid medium. In the first case the ester is chlorinated e. g. in a solution in carbon tetrachloride; nitrogenous chloro derivatives are thus formed when the starting material contains one or two amino groups. In the second method a medium of glacial acetic acid and hydrochloric acid, for example, is used; in this case any amino groups present in the starting material are spit off completely or partially as ammonium chloride. Thus, by chlorination of the methyl ester of 4-amino-2-hydroxybenzoic acid in a solution in chloroform two compounds were obtained, both with the empirical formula $C_8H_4O_3NCl_7$, one with a melting point of 159–161° C. (I), the other with a melting point of 130–132° C. (II). When the chlorination was effected in glacial acetic acid and hydrochloric acid, two compounds were also obtained, but these did not contain nitrogen any longer; they have the empirical formula $C_8H_4O_4Cl_6$, while one melts at 88–90° C. (III) and the other at 129–131° C. (IV). Another example is furnished by the chlorination of the methyl ester of 4-aminobenzoic acid; chlorination of the compound in carbon tetrachloride results in the formation of $C_8H_5O_2NCl_8$ (V), with a melting point of 151–153° C., while chlorination in glacial acetic acid and hydrochloric acid yields $C_8H_5O_3Cl_7$ (VI), with a melting point of 132–134° C. and $C_8H_6O_4Cl_6$ (VII) with a melting point of 199–200° C. It is also found that in the chlorination of these compounds the —COOR- group remains intact.

The compounds prepared according to the invention are new substances.

The chloro derivatives formed are susceptible of a great many reactions. In general, upon the action of strong reducing agents a number of chlorine atoms are removed from the molecule. Several of them liberate iodine from a KI solution, while one or two chlorine atoms are lost; thus the products I and II give rise to the formation of $C_8H_6O_3NCl_5$, while from III $C_8H_5O_4Cl_5$ is formed; by chlorination, these compounds can be converted into substances with more chlorine atoms again. By the action of concentrated hydrochloric acid the compounds I and II can be converted into nitrogen-free compounds; $C_8H_4O_4Cl_6$ is then formed; compound V reacts in a similar manner; with concentrated hydrochloric acid the compound VI, $C_8H_5O_3Cl_7$, is formed from this. Several highly chlorinated compounds give an addition compound with methanol and ethanol; thus compounds I and II with methanol give $C_9H_8O_4NCl_7$ (M. P. 172–174° C.), with ethanol $C_{10}H_{10}O_4NCl_7$ (M. P. 121–123° C.). The action of hypochlorous acid may give rise to opening of the ring; thus upon reaction of compound III with hypochlorous acid the aliphatic compound $C_8H_5O_5Cl_7$ (VIII) is formed.

In view of the circumstance that the highly chlorinated compounds prepared according to the invention are reactive, in which one or more chlorine atoms play a part, it was expected that they as well as compounds derived therefrom and containing many chlorine atoms would be active against microorganisms. This was actually found to be the case. Thus, compound II in a concentration of 0.02% appeared to be as active with regard to *Staphylococcus albus* (Oxford) as phenol in a concentration of 0.5%. The compounds were further found to act as a fungicide, e. g. towards *Pythium alternum*, *Aspergillus niger*, *Fusarium nivale*, etc.; they can therefore be used as seed-treating chemicals. Further the new compounds act as insecticides; thus the compound VIII appeared to be only slightly less active with regard to Drosophila than γ-hexachlorocyclohexane. Qualitatively, such actions were known for the products containing much chlorine, which had been obtained by chlorination of phenols and aromatic amines.

A striking feature is the low toxicity of the new compounds with regard to warm-blooded animals. Thus the $LD_{50}$ for compound II upon oral administration to mice is between 3 and 4 g./kg. body weight; for γ-hexachlorocyclohexane this value is 190 mg./kg. and for dichlorodiphenyltrichloro-ethane 150 mg./kg.

*Example I*

The methyl ester of 4-amino-2-hydroxybenzoic acid was chlorinated both in a neutral and in an acid medium.

For the chlorination in a neutral medium, 75.0 g. of the ester were suspended in 750 ml. of carbon tetrachloride. Into this suspension dry chlorine gas was introduced at such a rate that the solution did not boil. The reaction was interrupted when no more hydrogen chloride gas escaped from the reaction mixture. By means of a stream of dry air the dissolved chlorine was expelled, while after filtration the solvent was removed from the reaction mixture in vacuo. The residue was subsequently caused to crystallize by the addition of either. Thus 40.0 g. could be collected of a compound which after recrystallization from ligroin (B. P. 80–100° C.) melted from 159° to 162° C. (I). According to the analysis this is a compound $C_8H_4O_3NCl_7$.

*Analysis.*—Calculated: C, 23.39%; H, 0.97%; Cl, 60.53%; N, 3.41%. Found: C, 23.63%; H, 1.07%; Cl, 60.22%; N, 3.78%.

From the mother liquors of the above compound, 3.5 g. of an isomer with a melting point of 130–132° C. (II) were also isolated.

*Analysis.*—Calculated: Cl, 60.53%. Found: Cl, 60.47%.

The chlorination of the methyl ester of 3,5-dichloro-2-hydroxy-4-aminobenzoic acid under the same conditions results in the same reaction products.

As medium for this chlorination, carbon tetrachloride can be replaced by other neutrally reacting solvents, which do not themselves react with chlorine, such as e. g. chloroform.

For the chlorination in an acid medium, 10.0 g. of the methyl ester of 4-amino-2-hydroxybenzoic acid were suspended in 100 ml. of glacial acetic acid, upon which a rapid stream of chlorine gas was passed through the mixture. The ester dissolved, with evolution of heat, while after some time a white crystalline compound precipitated. The reaction was interrupted when the evolution of hydrogen chloride gas ceased. By means of a steam of air the chlorine dissolved in the reaction mixture was removed and the white compound (ammonium chloride) was filtered off. The solvent was subsequently removed from the filtrate in vacuo, upon which the distillation residue could be separated with the aid of either into two isomeric compounds with the empirical formula $C_8H_4O_4Cl_6$, with melting points of 88–90° C. (10.2 g.) (III) and 129–131° C. (3.7 g.) (IV) respectively. The solubility of the latter compound in either is smallest.

*Analyses.*—Calculated: C, 25.46%; H, 1.06%; Cl, 56.49%. (III) Found: C, 25.72%; H, 1.37%; Cl, 56.60%. (IV) Found: C, 24.88%; H, 1.04%; Cl, 56.24%.

When the chlorination is effected in a mixture of glacial acetic acid and concentrated hydrochloric acid, the proportion of the two reaction products is shifted even further towards the side of the isomer with the lower melting point.

As starting material for the reactions described, use may also be made of the methyl ester of 3,5-dichloro-2-hydroxy-4-aminobenzoic acid.

The two compounds $C_8H_4O_3NCl_7$, obtained by chlorination in a neutral medium, can both be converted with concentrated hydrochloric acid into $C_8H_4O_4Cl_6$ (M. P. 129–131° C.). Both compounds liberate iodine from an aqueous potassium iodide solution, and in doing so are themselves reduced to $C_8H_6O_3NCl_5$ (M. P. 184–186° C.). With methanol and ethanol they give addition products with the formulae $C_9H_8O_4NCl_7$ (M. P. 172–174° C.) and $C_{10}H_{10}O_4NCl_7$ (M. P. 121–123° C.) respectively.

The compounds $C_8H_4O_4Cl_6$ with melting point 88–90° C. and 129–131° C., obtained by chlorination in an acid medium, are reduced by an aqueous potassium iodide solution, with liberation of iodine, to $C_8H_5O_4Cl_5$ (M. P. 163–167° C.) and the methyl ester of 3,5-dichloro-2,4-dihydroxybenzoic acid (M. P. 165–167° C.) respectively.

Treatment with hyprochlorous acid causes the formation from $C_8H_4O_4Cl_6$ (M. P. 88–90° C.) of the aliphatic acid $C_8H_5O_5Cl_7$ (VIII).

Both isomers give an addition product with aniline, empirical formula $C_{14}H_{11}O_4NCl_6$, melting at 137–139° C. and 105–107° C. respectively.

*Example II*

To a mixture of 10.0 ml. of glacial acetic acid and 1.0 ml. of concentrated hydrochloric acid were added 2.4 g. of the methyl ester of 4-hydroxy-2-aminobenzoic acid. A stream of chlorine was subsequently passed through the suspension until no more evolution of hydrogen chloride gas could be observed. After completion of the reaction the ammonium chloride separated was filtered off, after the dissolved chlorine gas had been removed by passing a stream of dry air through the suspension. The filtrate was evaporated in vacuo, upon which the distillation residue was purified by recrystallization from petroleum ether (B. P. 80–100° C.).

Yield: 1.8 g. of the compound $C_8H_4O_4Cl_6$ with a melting point of 88–90° C.

Example *III*

To 250 ml. of acetic acid were added 25.0 g. of the methyl ester of 2,4-dihydroxybenzoic acid. Chlorine was passed through this mixture until no more evolution of hydrogen chloride gas could be observed. After completion of the reaction the dissolved chlorine was removed by passing through air. The reaction mixture was then evaporated in vacuo, upon which the distillation residue was separated with the aid of either into 32.0 g. of the compound $C_8H_4O_4Cl_6$ (M. P. 88–90° C.) and 2.8 g. of an isomer (M. P. 129–131° C.).

The same products were formed upon the chlorination of the methyl ester of 4-amino 2-hydroxybenzoic acid in an acid medium. When the methyl ester of 3,5-dichloro-2,4-dihydroxybenzoic acid is used as starting material for the chlorination, the same reaction products are obtained.

*Example IV*

20.0 g. of the methyl ester of 2,4-diaminobenzoic acid were suspended in a mixtuer of 80 ml. of glacial acetic acid and 20 ml. of concentrated hydrochloric acid. A stream of chlorine was passed through the mixture until no more evolution of hydrogen chloride gas could be observed. The dissolved chlorine was subsequently expelled from the reaction mixture by passing through air, upon which the white crystal paste was separated from the liquid by suction. The solid matter was separated from the ammonium chloride by suspension in water. The portion that was insoluble in water (13.3 g.) was sucked off and purified by recrystallization from chloroform or benzene; M. P. 172–174° C.

The compound formed appears to have the empirical formula $C_8H_6O_4NCl_7$.

*Analysis.* — Calculated: C, 22.38; H, 1.40%; Cl, 57.99%. Found: C, 22.95%; H, 1.40%; Cl, 57.57%.

From the residue, obtained by removal of the solvent from the filtrate of the original reaction mixture, 2.5 g. of the compound $C_8H_4O_4Cl_6$ (M. P. 129–131° C.) and 0.5 g. of a compound with the composition $C_8H_6O_5Cl_6$ (M. P. 146–148° C.) could also be isolated.

*Analysis.*—Calculated: C, 24.32%; H, 1.52%; Cl, 53.89%. Found: C, 24.40%; H, 1.69%; Cl, 54.06%.

Example V

The methyl ester of 4-aminobenzoic acid was chlorinated in a neutral as well as in an acid medium.

For the chlorination in a neutral medium, 25.0 g. of the ester were suspended in 250 ml. of carbon tetrachloride, upon which a stream of dry chlorine was passed through the mixture. When the evolution of hydrogen chloride gas stopped, the stream of chlorine was interrupted and the dissolved chlorine was removed from the reaction mixture by a stream of air. After filtration the solvent was subsequently distilled off. The residue could be recrystallized from petroleum ether (B. P. 80–100° C.), upon which finally 15.0 g. of a compound with the empirical formula $C_8H_5O_2NCl_8$ and the melting point 151–153° C. (V) could be collected.

*Analysis.*—Calculated: C, 22.27%; H, 1.14%; Cl, 66.0%. Found: C, 21.67%; H, 1.30%; Cl, 65.9%.

From the mother liquors a small amount (2.0 g.) of a compound with the formula $C_8H_5O_3Cl_7$ could also be isolated.

The latter compound could be obtained in a better yield if 11.0 g. of the methyl ester of 4-aminobenzoic acid were chlorinated in a medium of 50 ml. of glacial acetic acid and 10 ml. of concentrated hydrochloric acid. During the reaction ammonium chloride separated, which was filtered off. After removal of the solvent from the filtrate in vacuo, it was possible to isolate from the distillation residue, by recrystallization from petroleum ether (B. P. 80–100° C.), 8.0 g. of the compound $C_8H_5O_3Cl_7$ with melting point 132–134° C. (VI).

*Analysis.*—Calculated: C, 24.15%; H, 1.26%; Cl, 62.5%. Found: C, 24.20%; H, 1.28%; Cl, 63.3%.

From the mother liquors 2.5 g. of a compound with the formula $C_8H_6O_4Cl_6$ and melting point 199–200° C. (VII) were also separated.

*Analysis.*—Calculated: C, 25.33%; H, 1.58%; Cl, 56.20%. Found: C, 25.48%; H, 1.79%; Cl, 56.07%.

The same products can be obtained if the methyl ester of 3,5-dichloro-4-aminobenzoic acid is subjected to chlorination.

By a treatment with concentrated hydrochloric acid, the compound $C_8H_5O_2NCl_8$ (M. P. 151–153° C.), obtained by chlorination in a neutral medium, is converted into $C_8H_5O_3Cl_7$ (M. P. 132–134° C.), the main product in the case of chlorination in an acid medium.

Both compounds contain "active chlorine," i. e., they liberate iodine from an aqueous potassium iodide solution.

Example VI

To 50 ml. of glacial acetic acid were added 5.0 g. of the methyl ester of 4-hydroxybenzoic acid, upon which dry chlorine gas was passed through until no more hydrogen chloride gas escaped. The solution saturated with chlorine was left to stand for 2 days. A portion of the polychloro compound crystallized, while a second portion could be obtained by evaporation in vacuo of the glacial acetic acid and recrystallization of the distillation residue from petroleum ether (B. P. 80–100° C.).

Yield: 5.5 g. of the compound $C_8H_5O_3Cl_7$ (M. P. 132–134° C.).

The same product could be obtained by subjecting the methyl ester of 3,5-dichloro-4-hydroxybenzoic acid to a chlorination.

What I claim is:

1. Process for the preparation of chlorine-containing compounds which comprises introducing chlorine gas into a mixture of an alkyl ester of the group consisting of 2-hydroxy, 4-hydroxy, 2-amino, 4-amino, 2,4-dihydroxy, 2,4-diamino, 2-hydroxy-4-amino and 2-amino-4-hydroxy benzene carboxylic acids and their 3,5-dichloro derivatives in an organic medium at such a rate that the mixture does not boil and until the evolution of hydrogen chloride ceases and separating the reaction product containing from 6 to 10 chlorine atoms from the reaction mixture.

2. Process as defined in claim 1 in which the organic medium is a neutral organic liquid.

3. Process as defined in claim 1 in which the organic medium is carbon tetrachloride.

4. Process as defined in claim 1 in which the organic medium is chloroform.

5. Process as defined in claim 1 in which the organic medium is glacial acetic acid.

6. Process as defined in claim 1 in which the organic medium is a mixture of glacial acetic acid and hydrochloric acid.

References Cited in the file of this patent

Atkinson et al.: J. Am. Chem. Soc., 69, 3142 (1947).
Atkinson et al.: Chem. Abst., 42, 1580 (1948).